United States Patent [19]

Wang

[11] Patent Number: 4,651,986

[45] Date of Patent: Mar. 24, 1987

[54] HYDRAULIC EXERCISER

[76] Inventor: Shoei-Muh Wang, No. 21, Lane 498, Chungcheng South Road, Yung-Kang Hsiang, Tainan, Taiwan

[21] Appl. No.: 688,563

[22] Filed: Jan. 3, 1985

[30] Foreign Application Priority Data

Nov. 22, 1984 [TW] Taiwan ................................ 7329224

[51] Int. Cl.⁴ .......................... A63B 21/00; F16F 9/48
[52] U.S. Cl. ..................................... 272/130; 188/285
[58] Field of Search ................. 272/130, 143, DIG. 4; 188/285, 299, 322.16, 322.17, 322.14, 322.15

[56] References Cited

U.S. PATENT DOCUMENTS

| | | | |
|---|---|---|---|
| 3,990,548 | 11/1976 | Schupner | 188/322.15 X |
| 4,071,122 | 1/1978 | Schupner | 188/285 |
| 4,113,072 | 9/1978 | Palmer | 188/322.15 X |
| 4,291,787 | 9/1981 | Brenthan | 272/130 X |
| 4,478,387 | 10/1984 | Postema | 188/322.15 X |

FOREIGN PATENT DOCUMENTS 2064342  6/1981  United Kingdom ................ 272/143

Primary Examiner—Richard J. Apley
Assistant Examiner—Robert W. Bahr
Attorney, Agent, or Firm—Fulwider, Patton, Rieber, Lee & Utecht

[57] ABSTRACT

A hydraulic exerciser formed with a structure comprising a cylinder and an oil reservoir surrounding the cylinder and communicated therewith, a piston is slidably mounted in the cylinder, the upper end of the piston rod is protruded beyond a bearing which is supported on the upper end of the cylinder and the oil reservoir and provided with oil passages. There is a controlling mechanism provided with respect to the oil passages, which comprises a disc member has a sloped outer ring portion and an inner ring portion with a spiral contour; and a bushing member associated with the disc member and on which an oil hole is provided, with the turning of the bushing member relative to the disc member, the oil hole is covered by the spiral inner ring portion with different degrees and so that the opening thereof can be adjusted, the resistance of the oil when passing the oil hole and the oil passages thus can be varied.

3 Claims, 6 Drawing Figures

HYDRAULIC EXERCISER

BACKGROUND OF THE INVENTION

This invention relates to a hydraulic exerciser and particularly concerns an exerciser which can provide resistance to a pulling force.

There are various kinds of hydraulic exercisers for the training of the human body in which hydraulic power is utilized to provide a resistance opposite to the pulling force exerted by the user. When the user repeatedly tries to overcome the resistance, the energy of his muscle is consumed and as a result his muscles become stronger.

A hydraulic mechanism used in conventional exercisers is shown in FIG. 1, which comprises a cylinder 10 having a cap 30 attached to the upper end thereof, a bearing 20 disposed adjacent to the junction of the cap 30 and the cylinder 10, a piston rod 40 slidably mounted within the cylinder 10 and on the end of rod 40 a handle (not shown) is connected. The cylinder 10 includes an inner tube 101, and working fluid is received in the space between the piston rod 40 and the inner tube 101. When the piston rod 40 is pulled, the fluid such as oil, will flow through the clearance 201 between the piston rod 40 and the bearing 20 to the inner space of the cap 30, from where the oil flows to the outer tube 102 through the hole 202. Since the hole 202 has a small diameter, a large resistance is produced when the oil passes therethrough, and this resistance acts against the pulling action of the piston rod 40, when the user tries to overcome such resistance, thus affecting physical training.

However, the conventional device is unsatisfactory because the resistance provided by the oil cannot be adjusted, therefore, a single device may not be suitable for users of different strengths, physical conditions, ages, sexes, etc.

SUMMARY OF THE INVENTION

This invention is directed to obviating the above problem by providing for the incorporation into a hydraulic exerciser a controlling mechanism for adjusting the resistance thereof.

It is a further object of this invention to provide a non-step variable controlling mechanism for the hydraulic exercising device.

Accordingly the present invention comprises a hydraulic exerciser including a cylinder in which the working fluid is received, a piston slidable in the cylinder and attached to a rod that extends from one end of the cylinder, a fluid reservoir concentrically disposed around the cylinder and communicated therewith, and a bearing member mounted onto the cylinder and the fluid reservoir for slidably receiving the rod passed therethrough. The bearing member is provided with a first duct communicated with the cylinder for drawing the working fluid out from the cylinder with the movement of the rod, and a second duct communicated with the fluid reservoir to admit the working fluid into the fluid reservoir therethrough. The resistance offered when a quantity of working fluid flows through the second duct results in an opposite force against the pulling force exerted on the rod. The invention is characterized by a controlling ring member mounted above the bearing, including an outer ring portion and an inner ring portion lower than the level of the outer ring portion, the inner ring portion including a radial extension extended across the outer ring portion and defining a first end and a second end of the outer ring portion. The width of the inner ring portion decreases from a position corresponding to the first end of the outer ring portion toward a position corresponding to the second end of the outer ring portion, and the height of the outer ring portion is highest at the first end and sloped from the first end to the second end which is lowest. A bushing member is disposed above the controlling ring member and provided with an oil passage in a position facing the inner ring portion, which is capable of being turned with respect to the controlling ring member, so that the area of the inner ring portion directly under the oil passage can be varied, and thus changing the dimension of the oil passage and in turn varying the flow rate of the working fluid flowing through the oil passage.

According to another aspect of this invention, a spring member and a ball member are mounted in the bushing member, with the ball member biased against the inner ring portion of the controlling ring member, to resiliently couple the bushing member and the controlling ring member.

According to a further aspect of this invention, a concave recess provided on the inner ring portion is such that the ball member can be captured by the concave recess when the bushing member is turned to a position where the ball member is aligned with the concave recess.

BRIEF DESCRIPTION OF THE DRAWINGS

These and other features of the invention, and the advantages to be derived therefrom, will become apparent from the following detailed description of the preferred embodiment thereof, illustrated by way of an example only in the accompanying drawings, wherein.

DETAILED DESCRIPTION OF THE PREFERRED EMBODIMENT

Figure 1:
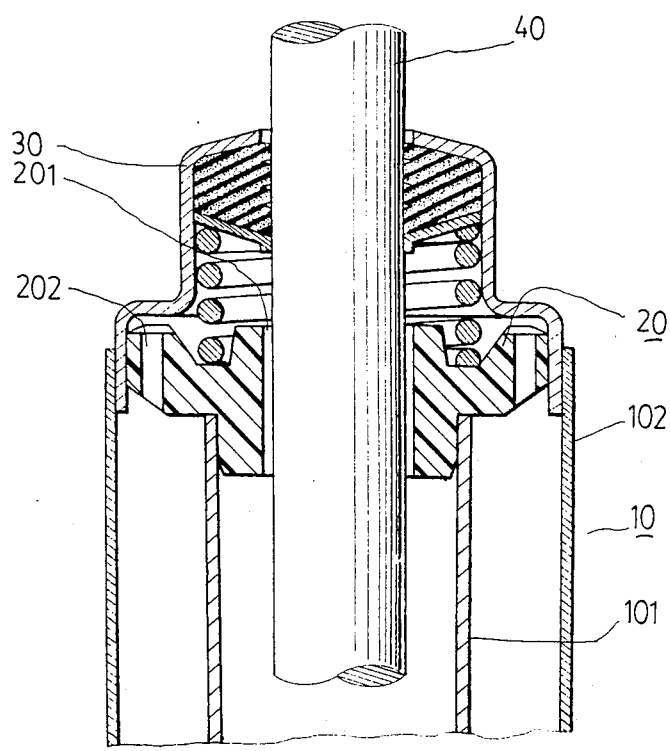
FIG. 1 is a fragmentary vertical section view of a conventional hydraulic cylinder for an exercising device.
Figure 2:
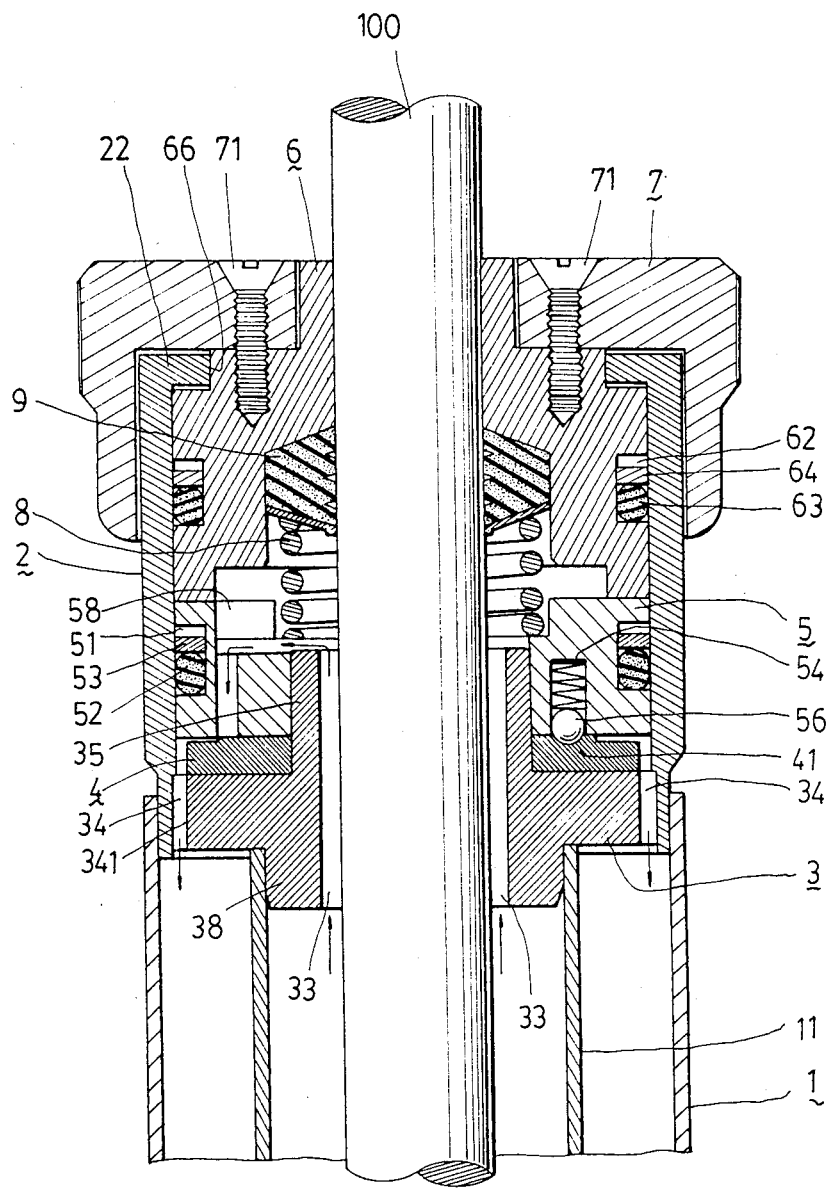
FIG. 2 is a fragmentary vertical section view of the hydraulic cylinder according to a preferred embodiment of this invention.

Referring now to FIG. 2, a cylindrical housing 1 is shown which forms a reservoir for the hydraulic fluid and, within the housing 1, the hydraulic piston 200, the cylinder 11 and the piston rod 100 are mounted. A sleeve member 2 extends from the upper end of the cylinder 11 and the lower end thereof is thinned to fit the inner diameter of the cylinder 11 and secured therewith. A cap 7 is mounted on the upper end of the sleeve member 2.

The driver member 6 is mounted around the piston rod 100 and secured with the cap 7 by means of screws 71, so that they can be turned as a whole. The driver member 6 has on the top end a step portion 66 for engaging against an inwardly projected flange 22 of the sleeve member 2, and a circular recess 62 formed on the circumferential surface thereof, the driver member 6 has a cylindrical upper section 65 of smaller diameter and protruding beyond the cap 7.

The circular recess 62 accommodates an O-ring 63 and a retaining ring 64 for preventing the working fluid from leaking.

The internal space of the driver member 6 is mounted with an oil seal 9 for avoiding leakage of the working fluid.

A bearing 3 substantially has a disc shape, having an upper tubular portion 35 and a lower tubular portion 38 which has a larger diameter than the upper tubular portion 35. The bearing 3 is supported on the top end of the hydraulic piston cylinder 11, with shoulder portion 341 seated against the top wall of the hydraulic piston cylinder 11, and the lower tubular portion 38 fitted into the same.

Figures 3, 4:
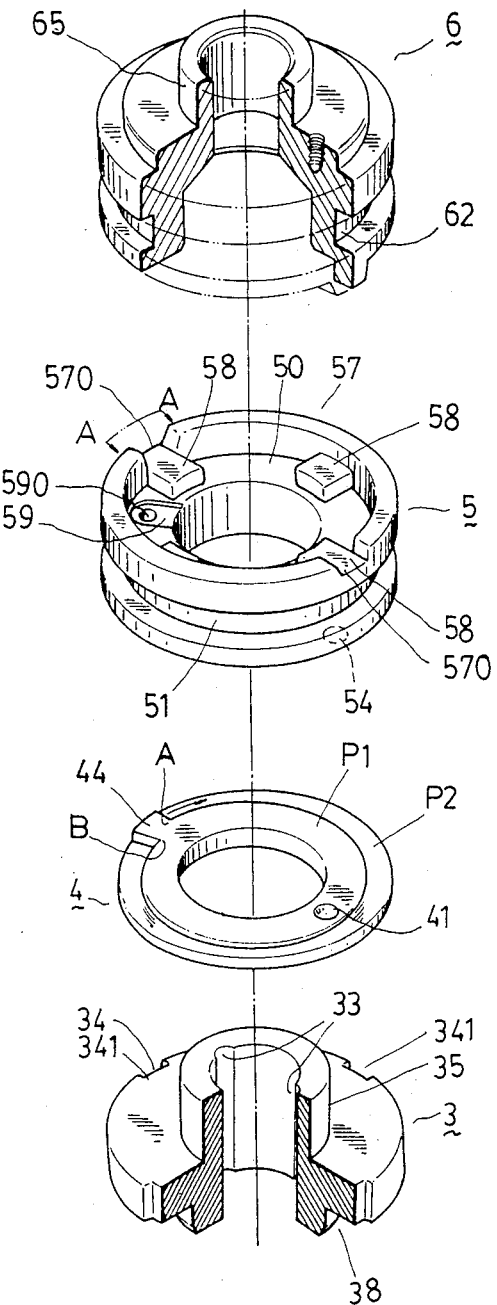
FIG. 3 is a schematic view showing the cooperative parts of the hydraulic cylinder as shown in FIG. 2.
FIG. 4 is a fragmentary side view viewed from the direction indicated by lines A—A of FIG. 3.

It is seen in FIG. 3 that the outer surface of the bearing 3 is formed with four recesses 34 cooperating with the sleeve member 2 to form passages for allowing the working fluid to flow through in a direction indicated by the outside arrows in FIG. 2. The recesses 34 are distributed an equal distance apart. There are two grooves 33 respectively contoured with a semicircular shape which are formed on the inner wall of the axial hole of the bearing 3, which are opposite to each other for admitting the fluid into the internal space of the driver member 6, in a direction as indicated by the inside arrows in FIG. 2, thereby constituting a fluid circuit between the cylinder 11 and the cylindrical housing 1. The fluid can be drawn through the grooves 33, when the piston rod 100 is pulled upwards.

A controlling ring member 4, shown in detail in FIG. 3, is mounted on the bearing 3. It comprises a substantially flat ring shape, having an inner ring portion P1 and an outer ring portion P2. The portion P1 is levelled higher than P2, and the width of P1 is decreased from where indicated by an A to where indicated by a B. As a result, the inner ring portion P1 is widest in the position marked with an A and narrowest at the position marked with a B in FIGS. 3 and 5. The outer ring portion P2 is thickest at a position marked with A and the surface thereof is sloped from the position A toward the position marked with B to provide a circular inclined plane. Between A and B there is a raised portion 44 formed as a radial extension of the inner ring portion P1.

A concave surface 41 is formed on the inner ring portion P1, and a rotatable steel ball 56 is partially received therein.

The bushing 5, made of a shape substantially like a cup, is mounted on the controlling ring member 4 and disposed around the upper tubular portion 35 of the bearing 3. At the intermediate portion of its surrounding wall 57, a groove 51 is provided for accommodating the O-ring 52 and the retaining ring 53 as shown in FIG. 2. The bottom surface of the bushing 5 has a smooth plane except for slot 54 which can be turned to a position corresponding to the concave surface 41. A spring 55 is received in slot 54 to bias the steel ball 56 to be held resiliently against the inner ring surface P1 of the controlling member 4, so that it permits the bushing 5 to resiliently couple with the controlling ring member 4. As soon as the bushing 5 is turned to a position where the slot 54 and the concave surface 41 are aligned with each other, the steel ball 56 is trapped into the concave surface 41.

It is appreciated that the ball 56 can be rotated out of the concave surface 41 with the turning of the bushing 5 through a circle of the inner ring portion P1 and returns to the concave surface 41. The user's fingers feel when the ball 56 is trapped in the concave surface 41 while turning the cap 7 and the bushing 5 through a cycle. In other embodiments the concave surface 41 can be provided in different positions, for example, it can be formed at the position A so that when the ball 56 is trapped into the concave surface 41, the user will know that the controlling member 4 has turned to a position where the largest resistance of the rod 100 will be obtained.

Further, the surrounding wall 57 is provided with a pair of opposed cut-outs 570 having two opposite side walls which are tapered downwardly, as illustrated in FIG. 4. Cut-outs 570 are extended upwardly from a step portion 58 provided on a ring seat 50 projected inwardly from the surrounding wall 57. At 90 degree positions with respect to the step portions 58 corresponding to the cut-outs 570 are two other opposing step portions 58 provided. The equally distributed four step portions 58 form retaining portions to confine a compression spring 8 on the ring seat 50 within the area defined by the front walls of the step portions 58, as can be seen in FIG. 2.

The lower end of the driver member 6 is provided with a pair of wedged legs 61 corresponding to the position of the pair of cut-outs 570 of the bushing 5, the legs 61 being contoured so that they can fit into the cut-outs 570 thus coupling the driver member 6 and the bushing 5 into position.

The cap 7 is fastened with the driver member 6, so that when turning the cap 7, the bushing 5 will be turned therewith.

On the top surface of the ring seat 50, a fingertip-shaped recess 59 is formed, and an oil passage 590 is formed thereon near the outward, rounded end of the fingertip-shaped recess 59.

The controlling ring member 4 is secured on the bearing 3, with the outermost portion of the peripheral wall thereof being aligned with the arcuate edges 341 of the recesses 34 as can be seen in FIG. 2. Therefore, the fluid is allowed to flow along the peripheral wall of the ring member 4, through the passages defined by the recesses 34 and the wall of the sleeve member 2 and into the cylindrical housing 1.

Figures 5, 6:
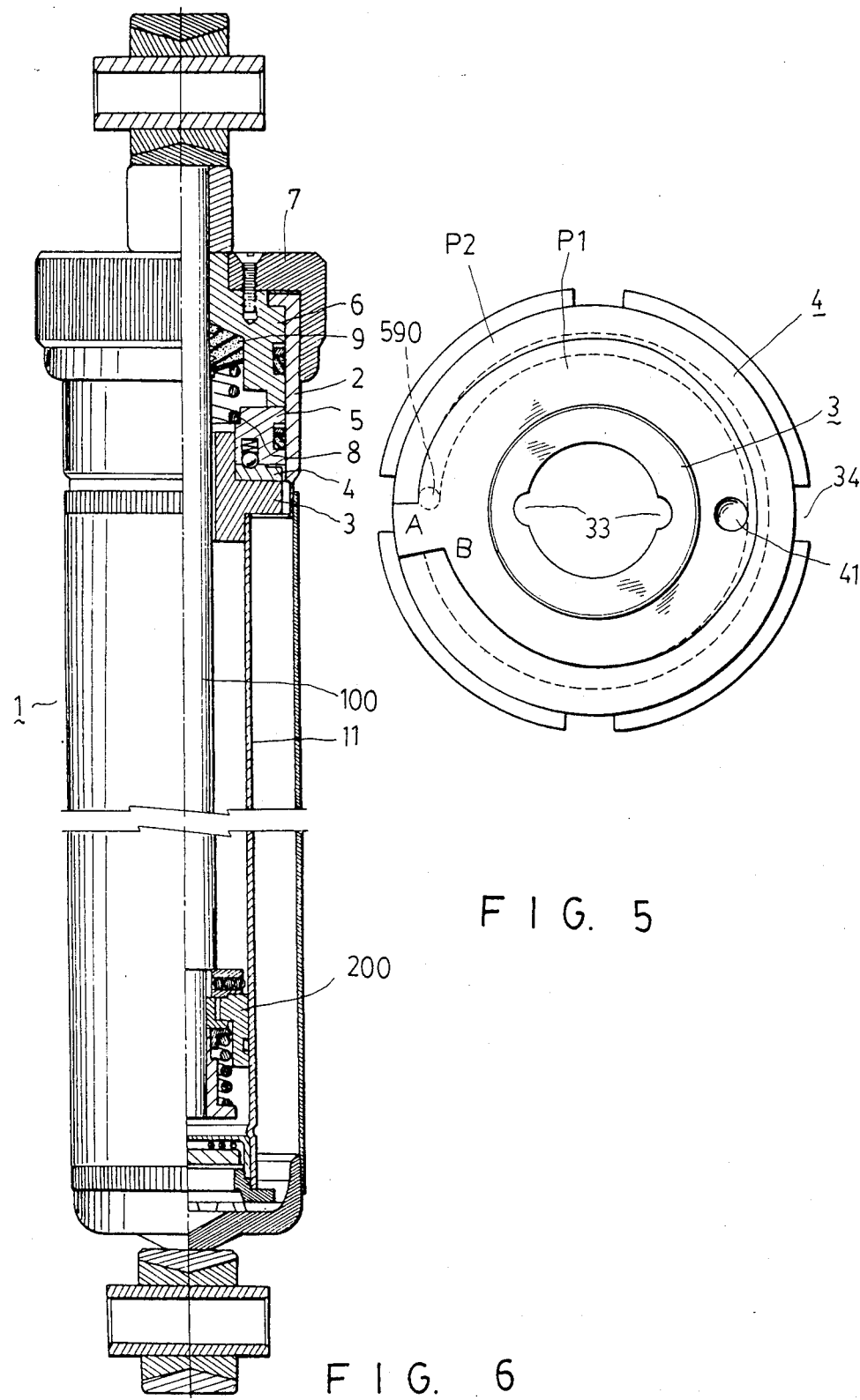
FIG. 5 is a schematic view showing the orbit of the fluid passage when operating the bearing with respect to the controlling ring member through a cycle.
FIG. 6 is a fragmentary front view of the preferred embodiment, with the left half portion shown in vertical section.

Referring to FIG. 5, the orbit of the oil passage 590 when turning the bushing member 5 through a cycle is shown by phantom lines in this figure. It should be understood that the flow rate of the working fluid is at a maximum when the oil passage 590 is turned to position B, since at position B the oil passage 590 is radially outward of the inner ring portion P1 and fully exposed. Therefore, the working fluid, flows through the oil passage 590 with least resistance at position B when compared with other positions. When the oil passes through the oil passage 590, it flows on the outer ring portion P2 in a direction toward the position B and is distributed to the recesses 34.

The flow is fully blocked off when the oil passage 590 is turned to position A, as shown by phantom lines in FIG. 5, where the passage 590 is fully blocked by the inner ring portion P1. Therefore, the maximum resistance against the movement of the piston rod 100 can be obtained when the bushing 5 is turned to the A position.

Between those two extreme positions, there are a variety of positions corresponding to different flow rates provided by turning the cap 7, the driver member 6 and the bushing 5 as a whole. As a result of this feature, variable resistance can be provided in consideration of the physical condition of the user through a very simple adjustment.

It will be apparent to those skilled in the art that I have accomplished at least the principal objects of the invention, and it also will be apparent to those skilled in the art that the embodiment herein described may be variously changed and modified, without departing from the spirit of the invention, and that the invention is capable of uses and has advantages not herein specifically described. Thus, it will be appreciated that the herein disclosed embodiment is illustrative only, and that the present invention is not limited thereto.

I claim:

1. In a hydraulic exerciser including a cylinder in which the working fluid is received, a piston slidable in said cylinder and attached to a rod which extends outwardly from one end of said cylinder and which is provided with securing means on the end thereof, a fluid reservoir concentrically disposed around said cylinder and in fluid communication therewith, and a bearing member mounted to one end of said cylinder and slidably receiving said rod passed therethrough, said bearing member provided with a first duct in fluid communication with the cylinder and a second duct in fluid communication with the fluid reservoir to pass working fluid therebetween by movement of the piston within the cylinder, the resistance offered when a quantity of working fluid flows through the ducts resulting in an opposite force against a force exerted on the rod, the improvement comprising a controlling ring member mounted above said bearing member having inner and outer ring portions having upper surfaces at different levels and including a radial extension extended across said inner and outer ring portions and defining a first end and a second end of a vertical wall interconnecting the inner and outer ring portions the radius of said interconnecting wall varying from said first end of said vertical wall to said second end of said vertical wall; and a bushing member disposed above said controlling ring member which is provided with a fluid passageway having an opening facing said vertical wall and which is capable of being turned with respect to said controlling ring member so that the area of said opening closed off by the uppermost surface of the ring portions can be varied, to control the flow of working fluid through said fluid passageway.

2. A hydraulic exerciser as claimed in claim 1 including a spring member and a ball member mounted in a cavity within said bushing member, with said ball member biased against said inner ring portion of said controlling ring member to resiliently couple said bushing member and said controlling ring member.

3. A hydraulic exerciser as claimed in claim 2 including a concave recess provided on said inner ring portion such that said ball member can be retained by said concave recess when said bushing member is turned to a position where said ball member is aligned with said concaved recess.

* * * * *